United States Patent
Shin et al.

(10) Patent No.: US 9,080,039 B2
(45) Date of Patent: Jul. 14, 2015

(54) THERMOPLASTIC RESIN COMPOSITION HAVING IMPROVED THERMAL CONDUCTIVITY AND ARTICLES THEREOF

(71) Applicant: Cheil Industries Inc., Gumi-si (KR)

(72) Inventors: Chan Gyun Shin, Seoul-Si (KR); Jeong Won Lee, Busan-Si (KR); Jong Cheol Lim, Anyang-Si (KR); Nam Hyun Kim, Seoul-Si (KR)

(73) Assignee: Cheil Industries Inc., Gumi-si (KR)

( * ) Notice: Subject to any disclaimer, the term of this patent is extended or adjusted under 35 U.S.C. 154(b) by 194 days.

(21) Appl. No.: 13/729,252

(22) Filed: Dec. 28, 2012

(65) Prior Publication Data

US 2013/0172444 A1 Jul. 4, 2013

(30) Foreign Application Priority Data

Dec. 30, 2011 (KR) .......................... 10-2011-0146992

(51) Int. Cl.
*C08K 7/16* (2006.01)
*C08K 13/02* (2006.01)
*C08K 3/22* (2006.01)
*C08K 7/14* (2006.01)
*C08K 9/06* (2006.01)
*C08L 77/06* (2006.01)

(52) U.S. Cl.
CPC . *C08K 13/02* (2013.01); *C08K 3/22* (2013.01); *C08K 7/14* (2013.01); *C08K 9/06* (2013.01); *C08L 77/06* (2013.01); *C08K 2003/222* (2013.01)

(58) Field of Classification Search
USPC .......................... 523/223, 213; 524/433, 494
See application file for complete search history.

(56) References Cited

U.S. PATENT DOCUMENTS

| | | | |
|---|---|---|---|
| 6,528,572 B1 | 3/2003 | Patel et al. | |
| 6,734,262 B2 | 5/2004 | Patel | |
| 6,942,823 B2 | 9/2005 | Terada et al. | |
| 7,060,241 B2 | 6/2006 | Glatkowski | |
| 7,211,543 B2 | 5/2007 | Nakabayashi et al. | |
| 7,238,415 B2 | 7/2007 | Rodriguez et al. | |
| 7,413,684 B2 | 8/2008 | Fishburn et al. | |
| 7,462,656 B2 | 12/2008 | Keulen et al. | |
| 7,696,274 B2 | 4/2010 | Terada et al. | |
| 8,765,858 B2 * | 7/2014 | Shin et al. ...................... 524/428 |
| 2003/0092824 A1 | 5/2003 | Bastiaens et al. | |
| 2003/0116757 A1 | 6/2003 | Miyoshi et al. | |
| 2004/0144963 A1 | 7/2004 | Braig et al. | |
| 2006/0233670 A1 * | 10/2006 | Lehto ............................ 422/100 |
| 2007/0021549 A1 | 1/2007 | Kojima et al. | |
| 2009/0152491 A1 | 6/2009 | Saga | |
| 2009/0321687 A1 | 12/2009 | Kim et al. | |
| 2013/0172444 A1 | 7/2013 | Shin et al. | |

FOREIGN PATENT DOCUMENTS

| | | |
|---|---|---|
| CN | 1864233 A | 11/2006 |
| JP | 1977-12240 A | 8/1978 |
| JP | 2004-168966 A | 6/2004 |
| KR | 10-2005-0013564 A | 2/2005 |
| KR | 10-2006-0052657 A | 5/2006 |
| WO | 2008/078849 A1 | 7/2008 |
| WO | 2011/010290 A1 | 1/2011 |

OTHER PUBLICATIONS

International Search Report in commonly owned International Application No. PCT/KR2006/005856, mailed Sep. 20, 2007.
Chinese Office Action in commonly owned Chinese Application No. 200680056762.7 dated Mar. 24, 2011, pp. 1-5.
English translation of Chinese Office Action in commonly owned Chinese Application No. 200680056762.7 dated Mar. 24, 2011, pp. 1-6.
Office Action in commonly owned U.S. Appl. No. 13/951,539 mailed Mar. 3, 2014, pp. 1-11.

* cited by examiner

*Primary Examiner* — Edward Cain
(74) *Attorney, Agent, or Firm* — Additon, Higgins & Pendleton, P.A.

(57) ABSTRACT

A thermoplastic resin composition comprises (A) about 30 to about 50% by weight of a thermoplastic resin, and (B) about 50 to about 70% by weight of a spherical magnesium oxide, wherein the thermal diffusivity of the thermoplastic resin composition in the horizontal or vertical direction is about 0.065 to about 0.20 cm$^2$/sec and the ratio of thermal diffusivity of the horizontal direction:vertical direction is about 1:0.5 to about 1:1. A thermoplastic resin composition according to a second embodiment comprises (A) about 30 to about 50% by weight of a thermoplastic resin, and (B) about 50 to about 70% by weight of a spherical magnesium oxide, wherein the spherical magnesium oxide is treated on its surface with a silane compound.

21 Claims, 1 Drawing Sheet

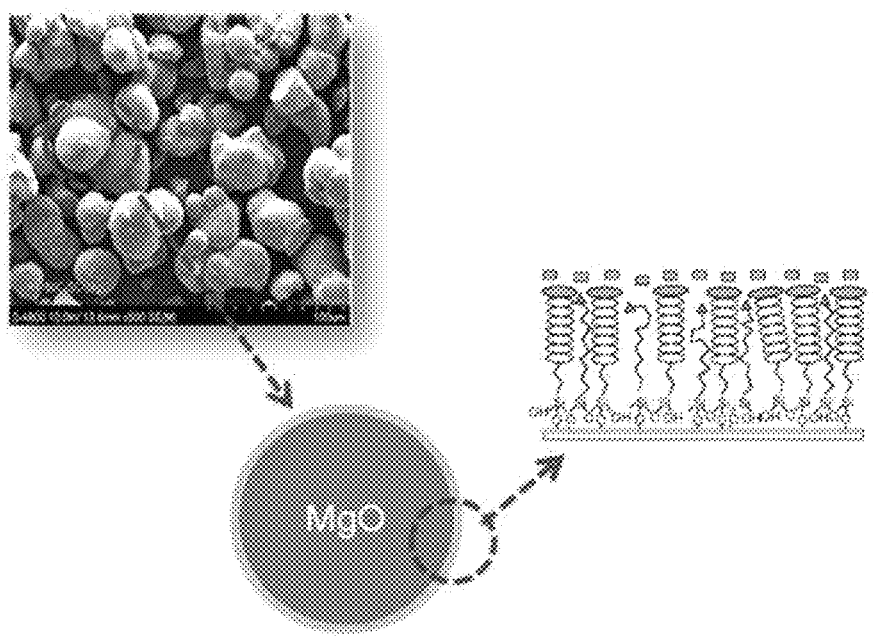

THERMOPLASTIC RESIN COMPOSITION HAVING IMPROVED THERMAL CONDUCTIVITY AND ARTICLES THEREOF

CROSS-REFERENCE TO RELATED APPLICATIONS

This application claims priority from Korea Patent Application No. 10-2011-0146992 filed Dec. 30, 2011, in the Korean Intellectual Property Office, the disclosure of which is incorporated herein by reference in its entirety.

FIELD OF THE INVENTION

The present invention relates to a thermoplastic resin composition having thermal conductivity.

BACKGROUND OF THE INVENTION

In electronic devices, components, such as the main body, chassis, and heat sinks having heat generating parts are typically produced from metals. The reason for using metals is that metals have a high thermal conductivity. A metal dissipates the heat received very quickly to the surrounding area as compared to other materials. Therefore, metals can maintain electronic parts that are sensitive to heat under high temperature conditions. In addition, metals have high mechanical strength as well as good processing capability in sheet metal machining, stamping, and cutting processes. Therefore, metals are suitable materials for use in heat sinks, the shape of which maybe complex.

It can be difficult, however, to make heat sinks made of metal light weight because of the high density of metal. Moreover, processing costs can be high with metals.

Therefore, thermally conductive materials using synthetic resins have been developed to replace metals. For example, a thermally conductive resin could be used to make heat dissipation sheets or heat dissipation grease on printers, copiers, notebook computers, and the like.

Recently, because of increased demand for high integration and high performance of electronic devices, high amounts of heat are generated inside electronic devices. In addition, electronic devices are becoming thinner or lighter in weight. Therefore, dissipation of heat generated by the devices poses serious problems. Sometimes, serious problems arise in electronic devices due to locally generated heat which ultimately can cause malfunctions or burning of the devices. Thermally conductive resin compositions developed so far have low thermal conductivities, and thus these problems remain unresolved.

If thermally conductive fillers are used in a large amounts to improve the thermal conductivity of the resin composition, the viscosity of the resin composition can increase, which can result in poor fluidity during the molding process. This can make it difficult to produce a product by an injection molding process. Also the strength of the final product may not be satisfactory. For the reasons enumerated above, it is important to form an effective network of fillers inside the resin composition to maximize the thermal conductivity while minimizing the amount of fillers used therein.

A resin with a much lower viscosity can be used so as not to impair the fluidity during injection molding process, even if fillers are added in a large quantity. However, resin with low viscosity has a low molecular weight which can increase the reactivity between the molecular chains during the extrusion or the injection molding process.

Accordingly, it is important to ensure fluidity to form an efficient network of fillers to produce a resin composition having a high thermal conductivity and to allow injection molding. Further, the viscosity of the resin should be reduced and the stability during the process should be maintained.

Typically, carbon or graphite fillers have been used to improve the thermal conductivity of resin compositions. Although these fillers have high thermal conductivity, they also have electrical conductivity and thus cannot be used in applications requiring electrical insulation, such as display or electronic devices.

Inorganic fillers can have high moisture absorbing property. Out-gas release of a resin composition including inorganic filler can increase during injection molding. This can also impair physical properties of the final product.

SUMMARY OF THE INVENTION

The present invention relates to a thermoplastic resin composition which can have improved thermal conductivity as well as excellent physical properties, such as flexural modulus, moisture resistance, electrical insulation property and fluidity.

One embodiment of the present invention (the first exemplary embodiment) provides a thermoplastic resin composition comprising (A) about 30 to about 50% by weight of a thermoplastic resin, and (B) about 50 to about 70% by weight of a spherical magnesium oxide, wherein the thermal diffusivity of the thermoplastic resin composition in the horizontal or vertical direction is about 0.065 to about 0.20 $cm^2/sec$ and the ratio of thermal diffusivity of the horizontal direction: vertical direction is about 1:0.5 to about 1:1.

The spherical magnesium oxide (B) can have an average particle size of about 30 to about 80 μm and a specific surface area (BET) of about 0.4 to about 0.6 m2/g.

The thermoplastic resin can include polyamide resin, polyphenylene sulfide resin, polyolefin resin, polyester resin, ABS (acrylonitrile-butadiene-styrene) resin, methacrylic resin, fluoride resin, polysulfone resin, polyether imide resin, polyether sulfone resin, polyether ketone resin, liquid crystal polyester resin, or a combination thereof.

The thermoplastic resin can include polyamide resin, polyphenylene sulfide resin, or a combination thereof.

The polyphenylene sulfide resin can have an average molecular weight of about 3,000 to about 50,000 g/mol.

The thermoplastic resin composition can further comprise about 5 to about 50 parts by weight of glass fiber (C) based on about 100 parts by weight of the thermoplastic resin composition.

The glass fiber (C) can have an average diameter of about 8 to about 20 μm and an average length of about 1.5 to about 8 mm.

The thermoplastic resin composition can further comprise antioxidant, lubricant, flame retardant, thermal stabilizer, inorganic additive, pigment, dye, or a combination thereof.

The thermoplastic resin composition can have a melt flow index in accordance with ASTM D1238 using pellets at 315° C. under a weight of 1.2 kg of more than about 5 g/10 min.

A molded product can be prepared using the thermoplastic resin composition.

Another embodiment of the present invention (the second exemplary embodiment) provides a thermoplastic resin composition comprising (A) about 30 to about 50% by weight of a thermoplastic resin and (B) about 50 to about 70% by weight of a spherical magnesium oxide, wherein the spherical magnesium oxide is treated on its surface with a silane compound.

The spherical magnesium oxide (B) can have an average particle size of about 30 to about 80 µm.

The thermoplastic resin can include polyamide resin, polyphenylene sulfide resin, polyolefin resin, polyester resin, ABS (acrylonitrile-butadiene-styrene) resin, methacrylic resin, fluoride resin, polysulfone resin, polyether imide resin, polyether sulfone resin, polyether ketone resin, liquid crystal polyester resin, or a combination thereof.

The thermoplastic resin can include polyamide resin, polyphenylene sulfide resin, or a combination thereof.

The silane compound can include silane oligomer including a vinyl group, amine group, or a combination thereof.

The silane compound can be included in an amount of about 0.1 to about 1.0 parts by weight based on about 100 parts by weight of the spherical magnesium oxide (B).

The silane oligomer including an amine group can be a polymer of a monomer comprising N-2(aminoethyl)3-aminopropyl methyldimethoxysilane, N-2(aminoethyl)3-aminopropyl trimethoxysilane, N-2(aminoethyl)3-aminopropyl triethoxysilane, 3-aminopropyl trimethoxysilane, 3-aminopropyl triethoxysilane, 3-triethoxysilyl-N-(1,3-dimethylbutylidene)propyl amine, N-phenyl-3-aminopropyl trimethoxysilane, or a combination thereof.

The thermoplastic resin composition can further comprise about 5 to about 50 parts by weight of glass fiber (C) based on about 100 parts by weight of the thermoplastic resin composition.

The thermoplastic resin composition can further comprise antioxidant, lubricant, flame retardant, thermal stabilizer, inorganic additive, pigment, dye, or a combination thereof.

The thermoplastic resin composition can have a thermal conductivity in accordance with ASTM E1461 of more than about 1.30 W/mK.

The thermoplastic resin composition can absorb moisture in an amount of less than about 1.5% by weight based on the total weight of the thermoplastic resin composition after treating it at 85° C. and a relative humidity of 85% for 72 hours.

A molded product can be prepared using the thermoplastic resin composition

The present invention can provide a thermoplastic resin composition having improved thermal conductivity as well as excellent physical properties, such as flexural modulus, moisture resistance, electrical insulation property, and fluidity.

BRIEF DESCRIPTION OF THE FIGURES

FIG. 1 is a mimetic diagram displaying the behavior of the chemical bonding of an inorganic filler and silane compound in accordance with the present invention.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

This invention relates to a thermoplastic resin composition that can have improved thermal conductivity as well as excellent physical properties, such as flexural modulus, moisture resistance, electrical insulation property and fluidity.

A thermally conductive thermoplastic resin composition in accordance with the present invention may comprise (A) about 30 to about 50% by weight of a thermoplastic resin; and (B) about 50 to about 70% by weight of a spherical magnesium oxide, each based on 100% by weight of the thermoplastic resin composition.

The thermoplastic resin composition can have a thermal diffusivity in the horizontal or vertical direction of about 0.065 to about 0.20 $cm^2$/sec and a ratio of thermal diffusivity of the horizontal direction:vertical direction of about 1:0.5 to about 1:1.

The spherical magnesium oxide (B) can be treated on its surface with a silane compound.

In this resin composition, glass fiber (C) or other additives (D) can be further included.

Each of these components is explained below in detail.

(A) Thermoplastic Resin

Any thermoplastic resin can be used without limitation if it is a thermoplastic resin. Examples of the thermoplastic resin can include without limitation polyamide resins; polyphenylene sulfide resins; polyolefin resins such as polyethylene resin and polypropylene resin; polyester resins; ABS (acrylonitrile-butadiene-styrene) resins; methacrylic resins; fluoride resins; polysulfone resins; polyether imide resins; polyether sulfone resins; polyether ketone resins; liquid crystal polyester resins, and the like, and combinations thereof.

In exemplary embodiments of this invention, the thermoplastic resin can include a polyamide resin and/or a polyphenylene sulfide resin to provide excellent thermal conductivity and electrical insulation property.

(A1) Polyamide Resin

A polyamide (PA) resin is a type of thermoplastic resin having amide (—NHCO—) bonds on the main chain of the (co)polymer. Examples of the polyamide resin can include without limitation PA 6, PA 66, PA 11, PA 46, PA 12, PA 1212, PA 1012, PA 610, PA 611, PA 612, PA 69, PA 6/66, PA 6T, PA 6I, PA 9T, PA 10T, PA 11T, PA 11T(H), PA 12T, PA 12I, PA 66/6T, PA 6T/6I, PA PACM 12, PA dimethyl PACM 12, PA MXD 6, and the like, and combinations thereof. The polyamide resin can also include polyamide resin in combination with another thermoplastic resin such as but not limited to PA/PPE (polyphenylene ether), PA/PPS (polyphenylene sulfide), PA/ABS, and the like.

Typical thermoplastic resin/metal composites have electrical conductivity. However, in the case of polyamide resin having a polar amide (—NHCO—) group, because of the electron trap it can exhibit electrical insulating property if it is used along with metallic components. Accordingly, a polyamide resin is very suitable for a resin composition which requires excellent fluidity as well as electrical insulation property and excellent thermal conductivity.

In particular, polycaproamide (PA 6), polytetramethylene adipamide (PA 46), polyhexamethylene adipamide (PA 66), polyhexamethylene nonanediamide (PA 69), polyhexamethylene sebacamide (PA 610), polycaproamide/polyhexamethylene adipamide copolymer (PA 6/66), polyhexamethylene dodecanamide (PA 612), polyhexamethylene undecanamide (PA 611), polydecamethylene dodecanamide (PA 1012), polydodecamethylene dodecanamide (PA 1212), polyundecanamide (PA 11), polydodecanamide (PA 12), polyhexamethylene terephthalamide (PA 6T), polyhexamethylene isophthalamide (PA 6I), polynonamethylene terephthalamide (PA 9T), polydecamethylene terephthalamide (PA 10T), polyundecamethylene terephthalamide (PA 11T), polyundecamethylene hexahydro terephthalamide (PA 11T(H)), polydodecamethylene terephthalamide (PA 12T), polydodecamethylene isophthalamide (PA 12I), polyhexamethylene terephthalamide/polyhexamethylene isophthalamide copolymer (PA 6T/6I), polyhexamethylene adipamide/polyhexamethylene terephthalamide copolymer (PA 66/6T), poly-bis(4-aminocyclohexyl)methane dodecanamide (PA PACM 12), poly-bis(3-methyl-4-aminocyclohexyl)methane dodecanamide (PA dimethyl PACM 12), and/or poly(m-xylene adipamide) (PA MXD 6) can be used. These compounds can be used individually or as a mixture of more than two.

In exemplary embodiments, PA 66 or PPA (polyphthalamide) such as PA 6T, PA 6I, PA PA9T, PA 10T, PA 11T, PA 11T(H), PA 12T, PA 12I, PA 66/6T, PA 6T/6I, and/or PA MXD6 can be used. Among these polyamide resins, PPA has high heat resistance, and thus it can be used in materials which require electrical insulation property and thermal conductivity.

The thermoplastic resin composition can include the polyamide in an amount of about 30 to about 50% by weight based on 100% by weight of the thermoplastic resin composition. In some embodiments, the thermoplastic resin composition can include the polyamide in an amount of about 30, 31, 32, 33, 34, 35, 36, 37, 38, 39, 40, 41, 42, 43, 44, 45, 46, 47, 48, 49, or 50% by weight. Further, according to some embodiments of the present invention, the amount of the polyamide can be in a range from about any of the foregoing amounts to about any other of the foregoing amounts.

If the polyamide resin is included in an amount within the above range, the composition can provide improved thermal conductivity and also good physical properties, such as flexural modulus, moisture resistance, electrical insulation property and fluidity.

(A2) Polyphenylene Sulfide Resin

Polyphenylene sulfide (PPS) resin is a thermoplastic resin. PPS resin has excellent heat resistance and maintains its properties at room temperature and also almost the same even at a lower temperature of −50° C. In addition, PPS can have excellent dimensional stability and creep resistance over a wide range of temperatures. Moreover, the polyphenylene sulfide resin is non-toxic and flame retardant. It also has a relatively low viscosity.

The polyphenylene sulfide resin used in the present invention can be a linear polyphenylene sulfide resin comprising a repeating unit having the following chemical formula 1 in an amount of more than about 70 mol %, based on the total moles of the resin.

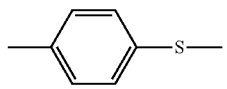

[Chemical formula 1]

Crystallinity is a characteristic feature of a crystalline polymer. The polyphenylene sulfide resin can have a high crystallinity and therefore may have excellent heat resistance, chemical resistance, and strength when it includes the repeating unit of Chemical formula 1 in an amount of greater than about 70 mol % in the polyphenylene sulfide resin. A representative method of preparation of the linear polyphenylene sulfide resin having a repeating unit of this structure is disclosed in Japanese Patent Bulletin No. 1977-12240, the entire disclosure of which is incorporated herein by referenced.

The polyphenylene sulfide resin may include a polyphenylene sulfide resin having a repeating unit with a different structure from the repeating unit of Chemical formula 1 in an amount of up to about 50 mol %, for example up to about 30 mol %. Chemical formulae 2 to 9 are non-limiting examples of repeating units having a different structure than the repeating unit of Chemical formula 1 that can be used.

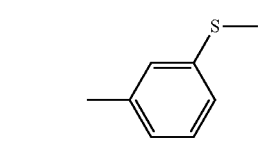

[Chemical formula 2]

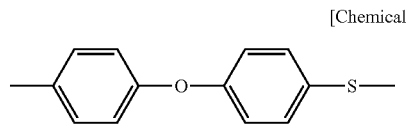

[Chemical formula 3]

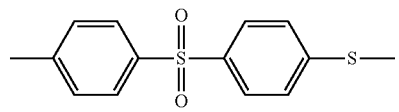

[Chemical formula 4]

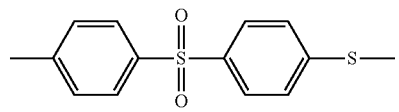

[Chemical formula 5]

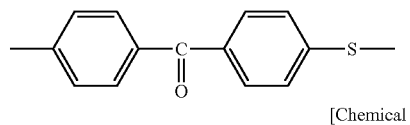

[Chemical formula 6]

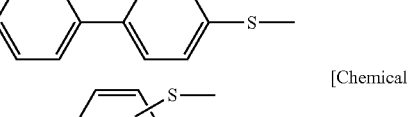

[Chemical formula 7]

In the above formula 7, R can be C1 to C10 alkyl, nitro, phenyl, C1 to C10 alkoxy, carboxyl or carboxylic acid salt.

[Chemical formula 8]

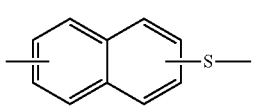

[Chemical formula 9]

In exemplary embodiments, a polyphenylene sulfide resin including more than about 50 mol % of p-dichlorobenzene and sodium sulfide can be used.

The polyphenylene sulfide resin can have a low viscosity, which can allow a lot of filling with the thermally conductive inorganic fillers. In exemplary embodiments, the polyphenylene sulfide resin can have a weight average molecular weight of about 3,000 to about 50,000 g/mol, for example about 5,000 to about 30,000 g/mol, to acquire a low viscosity. When the polyphenylene sulfide resin has a weight average molecular weight within the above range, the thermal stability of the resin can be excellent, which can minimize hardening that can result from the reaction between the resins during extrusion or injection molding processes.

The thermoplastic resin composition can include polyphenylene sulfide resin in an amount of about 30 to about 50% by weight based on 100% by weight of the thermoplastic resin composition. In some embodiments, the thermoplastic resin composition can include the polyphenylene sulfide in an amount of about 30, 31, 32, 33, 34, 35, 36, 37, 38, 39, 40, 41, 42, 43, 44, 45, 46, 47, 48, 49, or 50% by weight. Further, according to some embodiments of the present invention, the amount of the polyphenylene sulfide can be in a range from about any of the foregoing amounts to about any other of the foregoing amounts.

If the polyphenylene sulfide resin is included in an amount within the above range, this can improve thermal conductivity and also physical properties, such as flexural modulus, moisture resistance, electrical insulation property and fluidity.

(B) Spherical Magnesium Oxide

In accordance with the present invention, a spherical magnesium oxide (B) is introduced as a thermally conductive insulating filler. Spherical particles of magnesium oxide can provide good thermal diffusivity and fluidity of the thermoplastic resin composition. The spherical magnesium oxide (B) can have excellent thermal conductivity regardless of its orientation (not only in the horizontal direction (in-plane) but also in the vertical direction (z-direction) against or transverse to the injection molding direction). Furthermore, it also can have excellent electrical insulating property.

The spherical magnesium oxide (B) can have excellent fluidity as compared with plate-shaped particles or flakes. Plate-shaped fillers can increase the viscosity of the resin composition more than spherical fillers and therefore, plate-shaped fillers can ultimately reduce the fluidity of the resin composition. Therefore, plate-shaped fillers are not suitable in the present invention which requires excellent fluidity.

The fillers can have relatively larger particles to secure the fluidity of the resin composition. However, it is necessary to select the range of average particle size of fillers by taking into consideration its balance with the other physical properties of the resin composition.

In exemplary embodiments, the spherical magnesium oxide can have an average particle size of about 30 to about 80 µm, for example about 40 to about 60 µm. In some embodiments, the spherical magnesium oxide can have an average particle size of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 µm. Further, according to some embodiments of the present invention, the spherical magnesium oxide can have an average particle size in a range from about any of the foregoing amounts to about any other of the foregoing amounts.

In addition, in exemplary embodiments, the spherical magnesium oxide can have a specific surface area (BET) of about 0.4 to about 0.6 $m^2/g$.

If the average particle size is below about 30 µm and/or the BET exceeds about 0.6 $m^2/g$, then the fluidity of resin composition may be reduced. If the average particle size exceeds about 80 µm and/or the BET is below about 0.4 $m^2/g$, then the thermal conductivity of resin composition may be reduced.

The spherical magnesium oxide can have excellent thermal conductivity. However, its moisture absorption can be high due to hydration reaction. Accordingly, in exemplary embodiments, the spherical magnesium oxide can be surface treated with silane oligomers. In addition, the adhesion between the spherical magnesium oxide and the thermoplastic resin should be improved to secure the compatibility between these two.

Silane oligomers can induce direct chemical bonding with spherical magnesium oxide having excellent thermal properties. In addition, if the spherical magnesium oxide is treated with silane oligomer, the coefficient of thermal expansion can be further reduced in the thermoplastic resin composition, which can improve dimensional stability. Moreover, adhesion between the spherical magnesium oxide and the thermoplastic resin can be improved and the thermoplastic resin composition can have moisture resistance.

FIG. 1 is a mimetic diagram that explains the compatibility between a surface treated spherical magnesium oxide and the thermoplastic resin. It shows an improved affinity between the thermoplastic resin and the spherical magnesium oxide.

Silane oligomer is a polymerized product of a silane compound including a vinyl group and/or amine group. The weight average molecular weight of the silane oligomer can be about 30 to about 7,000 g/mol.

Examples of silane compounds including a vinyl group include without limitation vinyl trichlorosilane, vinyl trimethoxysilane, and the like, and combinations thereof.

Examples of silane compounds including amine groups include without limitation N-2(aminoethyl)3-aminopropyl methyldimethoxysilane, N-2(aminoethyl)3-aminopropyl trimethoxysilane, N-2(aminoethyl)3-aminopropyl triethoxysilane, 3-aminopropyl trimethoxysilane, 3-aminopropyl triethoxysilane, 3-triethoxysilyl-N-(1,3-dimethylbutylidene) propyl amine, N-phenyl-3-aminopropyl trimethoxysilane, and the like, and combinations thereof.

The spherical magnesium oxide treated with silane compound is used for the surface treatment of the spherical magnesium oxide with silane compound. As used herein, surface treatment includes adsorption along with chemical bonding. There are general surface treatment methods such as dry method and wet method.

The spherical magnesium oxide can be surface treated with silane compound in an amount of about 0.1 to about 1.0 parts by weight based on about 100 parts by weight of the spherical magnesium oxide. In some embodiments, the spherical magnesium oxide can be surface treated with silane compound in an amount of about 0.1, 0.2, 0.3, 0.4, 0.5, 0.6, 0.7, 0.8, 0.9, or 1.0 part by weight. Further, according to some embodiments of the present invention, the amount of the silane compound can be in a range from about any of the foregoing amounts to about any other of the foregoing amounts.

If the spherical magnesium oxide is surface treated with the silane compound in an amount within said the above range, it is possible to ensure the moisture resistance and the thermal conductivity without impairing any physical properties of the thermoplastic resin composition.

(C) Glass Fiber

The thermoplastic resin composition in accordance with the present invention may further comprise glass fiber.

Conventional glass fiber can be used in accordance with the present invention. The glass fiber can have a diameter of about 8 to about 20 µm and a length of about 1.5 to about 8 mm.

In some embodiments, the glass fiber can have a diameter of about 8, 9, 10, 11, 12, 13, 14, 15, 16, 17, 18, 19, or 20 µm. Further, according to some embodiments of the present invention, the glass fiber can have a diameter in a range from about any of the foregoing amounts to about any other of the foregoing amounts.

In some embodiments, the glass fiber can have an average length of about 1.5, 2, 2.5, 3, 3.5, 4, 4.5, 5, 5.5, 6, 6.5, 7, 7.5, or 8 µm. Further, according to some embodiments of the present invention, the glass fiber can have a length in a range from about any of the foregoing amounts to about any other of the foregoing amounts.

If the diameter of the glass fiber is within the above range, an excellent mechanical strength reinforcing effect may be obtained. In addition, if the length of the glass fiber is within the above range, glass fiber can be easily fed into the extruder and the mechanical strength of the resin composition may be greatly improved.

Examples of the glass fiber includes without limitation basalt fiber, fiber prepared from biomass, and the like, and combinations thereof. The glass fiber with circular, oval, rectangular, and/or dumbbell-shaped cross-section may also be used.

The glass fiber can be treated with specified glass fiber treating agents to prevent the reactivity thereof with the thermoplastic resin and to improve its wettability with the thermoplastic resin. This treatment can be carried out during the preparation of glass fiber or during a post processing stage of glass fiber.

Lubricants, coupling agents, and/or surfactants can be used as glass fiber treating agents. Lubricants can be used to form a good strand having a uniform thickness of a specified diameter during preparation of the glass fiber. Coupling agents can provide good adhesion between the glass fiber and the thermoplastic resin. If these glass fiber treating agents are appropriately selected and used according to the type of the thermoplastic resin and glass fiber being treated, then good physical property can be obtained in the glass fiber reinforced thermoplastic resin composition.

The thermoplastic resin composition can include glass fiber in an amount of about of 5 to about 50 parts by weight based on about 100 parts by weight of the thermoplastic resin composition. In some embodiments, the thermoplastic resin composition can include glass fiber in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of glass fiber can be in a range from about any of the foregoing amounts to about any other of the foregoing amounts.

If the glass fiber is included in an amount within the above range, the flexural modulus and heat resistance of the thermoplastic resin composition can be improved. Moreover, glass fiber may give an excellent fluidity to secure good processability of thermoplastic resin composition.

(D) Other Additive(s)

The thermoplastic resin composition can include one or more additional additives. Examples of the additives can include without limitation antioxidants, lubricants, flame retardants, thermal stabilizers, inorganic additives, pigments, dyes, and the like, and mixture thereof. The additives can be included to improve the physical properties of the thermoplastic resin composition in conventional amounts readily determined by the skilled artisan so long as the additive does not impair the thermal conductivity of the thermoplastic resin composition.

The thermoplastic resin composition in accordance with the present invention can be prepared using conventional methods known in the art for making a resin composition. For example, after mixing the aforesaid components and optionally other additives, the composition can be melt-extruded by an extruder to produce pellet shaped resin composition. Various products can be manufactured by injection molding, blow molding, compression molding, and/or extrusion molding processes using the pellets.

The thermoplastic resin composition can be used in manufacturing a variety of products, including the manufacture of main bodies of electrical or electronic products such as TVs, computers, mobile phones, office automation devices and chassis, heat sinks, LED heat radiation pins, and the like, which require an excellent thermal conductivity.

The thermal diffusivity of the thermoplastic resin composition and a product made of the same may be about 0.065 to about 0.20 cm$^2$/sec. The thermal diffusivity of the thermoplastic resin composition in the horizontal direction:vertical direction based on the direction of injection molding may be about 1:0.5 to about 1:1.

Exemplary embodiments in accordance with the present invention are described herein. However, the following examples are merely to exemplify the present invention and should not be interpreted either to limit or restrict the scope of protection of the present invention.

Examples of the First Embodiment

The specification of each component used in the examples and comparative examples for the first exemplary embodiment are given below.

(A) Polyphenylene Sulfide (PPS) Resin

Polyphenylene sulfide resin from Dukyang (China) having a weight average molecular weight of 32,000 g/mol is used.

(B) Thermally Conductive Fillers (b1) A spherical magnesium oxide (MgO) having an average particle size of 50 μm and a BET of 0.5 m$^2$/g is used.

(b2) A spherical aluminum oxide (Al$_2$O$_3$) having an average particle size of 50 μm from Denka (Japan) is used.

(b3) A flaky aluminum oxide (Al$_2$O$_3$) having an aspect ratio of 6 is used.

(b4) A flaky boron nitride (BN) having an aspect ratio of 7 from Momentive (U.S.A) is used.

(b5) A spherical magnesium oxide (MgO) having an average particle size of 20 μm and a BET of 0.7 m$^2$/g is used.

(b6) A spherical magnesium oxide (MgO) having an average particle size of 100 μm and a BET of 0.1 m$^2$/g is used.

(b7) A spherical magnesium oxide (MgO) having an average particle size of 50 μm and a BET of 0.9 m$^2$/g is used.

(b8) A graphite having an aspect ratio of 20 is used.

Example 1

30% by weight of the polyphenylene sulfide resin (A) and 70% by weight of the spherical magnesium oxide (b1) as thermally conductive filler are mixed to prepare a polyphenylene sulfide resin composition. This polyphenylene sulfide resin composition is processed by a twin screw extruder with a screw size L/D=36, Φ=45 mm and a cylinder temperature of 250 to 350° C. to prepare pellets. The prepared pallets are dried at 90° C. for more than three hours and specimens in accordance with ASTM specifications are prepared by injection molding at a temperature of 300° C. to measure the physical properties, such as the thermal diffusivity, flexural modulus and surface resistivity.

Examples 2 to 3 and Comparative Examples 1 to 9

Specimens are prepared in accordance with the same method of Example 1 except using the compositions set forth in Table 1 below.

Methods for Measuring Physical Properties (1) Thermal diffusivity (cm$^2$/sec): The thermal diffusivity is measured in accordance with ASTM E1461 in the horizontal direction and in the vertical direction transverse to the injection molding direction.

(2) Flexural modulus (GPa): The flexural modulus is measured in accordance with ASTM D790 using a specimen with a thickness of 0.25 inch.

(3) Melt flow index (g/10 min): The melt flow index is measured in accordance with ASTM D1238 using pellets at 315° C. under a weight of 1.2 kg.

(4) Surface resistivity (Ω/sq): The surface resistivity is measured in accordance with ASTM D257 using a specimen at 25° C. with SRM-110 from Wolfgang Warmbier (Germany).

(5) Specific surface area (m²/g): The specific surface area (BET) of the spherical magnesium oxide is measured at −196° C. under nitrogen gas atmosphere with BELSORP-max mini II from BEL (Japan).

TABLE 1

|  | Example | | |
|---|---|---|---|
|  | 1 | 2 | 3 |
| PPS (A) | 30 | 40 | 50 |
| MgO (b1) | 70 | 60 | 50 |
| Al₂O₃ (b2) | — | — | — |
| Al₂O₃ (b3) | — | — | — |
| BN (b4) | — | — | — |
| MgO (b5) | — | — | — |
| MgO (b6) | — | — | — |
| MgO (b7) | — | — | — |
| Graphite (b8) | — | — | — |
| Thermal diffusivity toward horizontal direction (cm²/sec) | 0.120 | 0.095 | 0.084 |
| Thermal diffusivity toward vertical direction (cm²/sec) | 0.110 | 0.085 | 0.072 |
| Flexural modulus (GPa) | 12.2 | 10.5 | 8.8 |
| Melt flow index (g/10 min) | 8.5 | 11.5 | 13.8 |
| Surface resistivity (Ω/sq) | $10^{12}$ | $10^{12}$ | $10^{12}$ |

(Unit: % by weight)

In addition, in Comparative Example 2 in which flaky aluminum oxide is used, the thermal diffusivity in the horizontal direction is much lower than that of vertical direction as compared with Example 2 in which the same amount of a spherical magnesium oxide (b1) is used. The thermal conductivity as well as the fluidity of Comparative Example 2 which includes flaky aluminum oxide is inferior as compared with the present invention.

In particular, when Comparative Example 3, in which boron nitride is used which is generally used as a thermally conductive filler, is compared with Example 2, although the thermal diffusivity in the horizontal direction is not much different, the thermal diffusivity in the vertical direction of Example 2 is much higher than that of Comparative Example 3. Also, the flexural modulus and fluidity of Example 2 are much higher than those of Comparative Example 3.

In relation with the particle size and specific surface area (BET) of the spherical magnesium oxide in Comparative Example 6, in which the particle size is below 30 μm and the BET exceeds 0.6 m²/g, the overall thermal diffusivity and fluidity are reduced as compared with Example 2. In Comparative Example 7 in which the particle size exceeds 80 μm and the BET is below 0.4 m²/g, the overall thermal diffusivity is reduced. In Comparative Example 8 in which the BET exceeds 0.6 m²/g, the overall thermal diffusivity and fluidity are reduced.

In addition, in Comparative Example 9 in which graphite is used, the surface resistivity is too low and exhibits high electrical conductivity. Thus thermoplastic resin composition

TABLE 2

|  | Comparative Example | | | | | | | | |
|---|---|---|---|---|---|---|---|---|---|
|  | 1 | 2 | 3 | 4 | 5 | 6 | 7 | 8 | 9 |
| PPS (A) | 40 | 40 | 60 | 40 | 60 | 40 | 40 | 40 | 40 |
| MgO (b1) | — | — | — | — | — | — | — | — | — |
| Al₂O₃ (b2) | 60 | — | — | 30 | 20 | — | — | — | — |
| Al₂O₃ (b3) | — | 60 | — | 30 | — | — | — | — | — |
| BN (b4) | — | — | 40 | — | 20 | — | — | — | — |
| MgO (b5) | — | — | — | — | — | 60 | — | — | — |
| MgO (b6) | — | — | — | — | — | — | 60 | — | — |
| MgO (b7) | — | — | — | — | — | — | — | 60 | — |
| Graphite (b8) | — | — | — | — | — | — | — | — | 60 |
| Thermal diffusivity toward horizontal direction (cm²/sec) | 0.034 | 0.022 | 0.100 | 0.082 | 0.060 | 0.060 | 0.042 | 0.032 | 0.072 |
| Thermal diffusivity toward vertical direction (cm²/sec) | 0.028 | 0.008 | 0.040 | 0.042 | 0.035 | 0.058 | 0.043 | 0.035 | 0.025 |
| Flexural modulus (GPa) | 11.6 | 10.8 | 7.0 | 10.1 | 9.9 | 9.2 | 10.1 | 9.6 | 6.5 |
| Melt flow index (g/10 min) | 10.2 | 5.2 | 2.5 | 7.8 | 6.5 | 3.1 | 12.7 | 4.2 | 1.5 |
| Surface resistivity (Ω/sq) | $10^{12}$ | $10^{12}$ | $10^{12}$ | $10^{12}$ | $10^{12}$ | $10^{12}$ | $10^{12}$ | $10^{12}$ | $10^{3}$ |

(Unit: % by weight)

As can be seen from Table 2, both of thermal diffusivities in the horizontal and vertical direction of Examples 1 to 3 which includes a spherical magnesium oxide (b1) are excellent. In addition, the flexural modulus is excellent with sufficient fluidity.

The difference between thermal diffusivity in the horizontal and vertical directions of Comparative Example 1 which includes a spherical aluminum oxide is small. However, the overall thermal diffusivity is low as compared with that of Example 2 which includes a spherical magnesium oxide (b1).

having graphite is unsuitable for applications requiring electrical insulation, such as electronic devices.

Examples for the Second Embodiment

The specification of each component used in the examples and comparative examples for the second exemplary embodiment are given below.

(A) Polyamide Resin

CX7323 polyamide (PA) resin from Evonik (Germany) is used.

(B) Thermally Conductive Fillers (b11) A spherical magnesium oxide (MgO) having an average particle size of 50 μm and a BET of 0.5 m²/g is used.

(b12) A spherical magnesium oxide (MgO) having an average particle size of 50 μm and a BET of 0.5 m²/g, which is treated with a silane oligomer is used. RF-50-SC is used in an amount of 0.05 parts by weight based on 100 parts by weight of the spherical magnesium oxide as a silane oligomer including a vinyl group.

(b13) A spherical magnesium oxide (MgO) having an average particle size of 50 μm and a BET of 0.5 m²/g, which is treated with a silane oligomer is used. RF-50-AC is used in an amount of 0.05 parts by weight based on 100 parts by weight of a spherical magnesium oxide as a silane oligomer including an amine group.

(b21) A spherical aluminum oxide ($Al_2O_3$) having an average particle size of 50 μm from Denka (Japan) is used.

(b22) A spherical aluminum oxide ($Al_2O_3$) having an average particle size of 50 μm from Denka (Japan), which is treated with a silane oligomer is used. RF-50-SC is used in an amount of 0.05 parts by weight based on 100 parts by weight of the spherical aluminum oxide as a silane oligomer including a vinyl group.

Example 4

30% by weight of the polyamide resin (A) and 70% by weight of the spherical magnesium oxide treated with silane oligomer (b12) as thermally conductive filler are mixed to prepare the polyamide resin composition. This polyamide resin composition is processed by a twin screw extruder with a screw size L/D=36, Φ=45 mm and a cylinder temperature of 250 to 350° C. to prepare pellets. The prepared pallets are dried at 90° C. for more than three hours and specimens in accordance with ASTM specifications are prepared by injection molding at a temperature of 300° C. to measure the physical properties, such as the thermal conductivity, flexural strength, flexural modulus and tensile strength.

Examples 5 to 9 and Comparative Examples 10 to 18

Specimens are prepared in accordance with the same method of Example 4 except using the compositions set forth in Table 3 below.

Examples 4 to 5 and Comparative Example 11

The changes in the moisture absorption of Examples 4 to 5 and Comparative Example 11 are set forth in Table 4 below.

Methods for Measuring Physical Properties (1) Thermal conductivity (W/mK): The thermal conductivity is measured in accordance with ASTM E1461.

(2) Flexural strength (MPa): The flexural strength is measured in accordance with ASTM D790 using a specimen with a thickness of 0.25 inch.

(3) Flexural modulus (GPa): The flexural modulus is measured in accordance with ASTM D790 using a specimen with a thickness of 0.25 inch.

(4) Tensile strength (MPa): The tensile strength is measured in accordance with ASTM D638 using a specimen with a thickness of 0.125 inch.

(5) Moisture absorption (% by weight): The moisture absorption is measured the changes in weight during the time elapsed in the specimen at 85° C., relative humidity of 85%.

TABLE 3

| | | Example | | | | | | Comparative Example | | | | | | | | |
|---|---|---|---|---|---|---|---|---|---|---|---|---|---|---|---|---|
| | | 4 | 5 | 6 | 7 | 8 | 9 | 10 | 11 | 12 | 13 | 14 | 15 | 16 | 17 | 18 |
| PA (A) | | 30 | 30 | 40 | 40 | 50 | 50 | 30 | 30 | 30 | 40 | 40 | 50 | 50 | 60 | 20 |
| MgO | (b11) | — | — | — | — | — | — | — | 70 | — | — | 60 | — | 50 | — | — |
| | (b12) | 70 | — | 60 | — | 50 | — | — | — | — | — | — | — | — | 40 | 80 |
| | (b13) | — | 70 | — | 60 | — | 50 | — | — | — | — | — | — | — | — | — |
| $Al_2O_3$ | (b21) | — | — | — | — | — | — | 70 | — | — | — | — | 50 | — | — | — |
| | (b22) | — | — | — | — | — | — | — | — | 70 | 60 | — | — | — | — | — |
| Thermal conductivity (W/mK) | | 2.52 | 2.87 | 1.91 | 2.10 | 1.32 | 1.41 | 1.65 | 2.23 | 1.88 | 1.30 | 1.58 | 0.69 | 1.17 | 0.98 | 3.07 |
| Flexural strength (MPa) | | 41 | 51 | 79 | 92 | 110 | 121 | 37 | 38 | 52 | 62 | 61 | 90 | 92 | 130 | 35 |
| Flexural modulus (GPa) | | 12.0 | 12.1 | 9.0 | 9.1 | 8.2 | 8.2 | 14.0 | 12.0 | 14.0 | 10.0 | 9.0 | 8.2 | 8.2 | 7.5 | 14.0 |
| Tensile strength (MPa) | | 35 | 41 | 48 | 54 | 58 | 65 | 28 | 29 | 41 | 33 | 35 | 45 | 48 | 72 | 30 |

TABLE 4

| | | Time (hours) | | | | | | | |
|---|---|---|---|---|---|---|---|---|---|
| | | 0 | 6 | 12 | 24 | 36 | 48 | 60 | 72 |
| Moisture absorption (% by weight) | Example 4 | 0 | 0.02 | 0.03 | 0.05 | 0.05 | 0.05 | 0.06 | 0.06 |
| | Example 5 | 0 | 0.05 | 0.06 | 0.07 | 0.08 | 0.12 | 0.12 | 0.12 |
| | Comparative Example 11 | 0 | 0.9 | 1.5 | 2.6 | 4.7 | 5.2 | 5.2 | 5.23 |

As the amount of inorganic filler content such as magnesium oxide or aluminum oxide increases, the flexural modulus of the resin composition increases but the tensile strength and flexural strength decrease. Therefore, maintaining a balance between these physical properties and securing an adequate thermal conductivity are important selection criteria of the resin composition to be used as electronic materials, such as LED radiation pins.

As shown in Table 3, Examples 4 to 9, which use spherical magnesium oxide treated on its surface with silane oligomer including an amine group or vinyl group, show an increased thermal conductivity by around 10 to 105% as compared with the spherical aluminum oxide treated with silane oligomer including the same amount of vinyl group (Comparative Examples 12 and 13), the spherical aluminum oxide without surface treatment (Comparative Examples 10 and 15), and the spherical magnesium oxide without surface treatment (Comparative Examples 11, 14 and 16).

In particular, the moisture resistance with elapsed time is remarkably higher in Examples 4 and 5 wherein the spherical magnesium oxide treated on its surface with silane oligomer including an amine group or vinyl group than Comparative Example 11. From Table 4, it can be seen that Example 4 which includes the spherical magnesium oxide treated with silane oligomer including a vinyl group shows relatively higher moisture resistance than Example 5. This is because amide groups have a relatively higher moisture absorption due to hydrogen bonding with moisture as compared with vinyl groups. Therefore, as the amount of amide groups in the molecular structure decreases, the moisture absorption may be low.

In addition, when the spherical magnesium oxide with surface treatment is included in an amount less than about 50% by weight as in Comparative Example 17, it is not possible to secure adequate thermal conductivity. If the spherical magnesium oxide with surface treatment is included in an amount greater than about 70% by weight as in Comparative Example 18, although thermal conductivity is not increased, the tensile strength and flexural strength are reduced.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
   (A) about 30 to about 50% by weight of a thermoplastic resin;
   (B) about 50 to about 70% by weight of a spherical magnesium oxide; and
   (C) about 5 to about 50 parts by weight of glass fiber based on about 100 parts by weight of the thermoplastic resin composition,
   wherein the thermal diffusivity of the thermoplastic resin composition towards the horizontal or vertical direction is about 0.065 to about 0.20 $cm^2/sec$ and the ratio of thermal diffusivity of the horizontal direction:vertical direction is about 1:0.5 to about 1:1.

2. The thermoplastic resin composition of claim 1, wherein the spherical magnesium oxide (B) has an average particle size of about 30 to about 80 μm.

3. The thermoplastic resin composition of claim 1, wherein the spherical magnesium oxide (B) has a specific surface area (BET) of about 0.4 to about 0.6 $m^2/g$.

4. The thermoplastic resin composition of claim 1, wherein the thermoplastic resin comprises polyamide resin, polyphenylene sulfide resin, polyolefin resin, polyester resin, ABS (acrylonitrile-butadiene-styrene) resin, methacrylic resin, fluoride resin, polysulfone resin, polyether imide resin, polyether sulfone resin, polyether ketone resin, liquid crystal polyester resin, or a combination thereof.

5. The thermoplastic resin composition of claim 4, wherein the thermoplastic resin comprises polyamide resin, polyphenylene sulfide resin, or a combination thereof.

6. The thermoplastic resin composition of claim 5, the polyphenylene sulfide resin has an average molecular weight of about 3,000 to about 50,000 g/mol.

7. The thermoplastic resin composition of claim 1, wherein the glass fiber (C) has an average diameter of about 8 to about 20 μm and a length of about 1.5 to about 8 mm.

8. The thermoplastic resin composition of claim 1, wherein the thermoplastic resin composition further comprises antioxidant, lubricant, flame retardant, thermal stabilizer, inorganic additive, pigment, dye, or a combination thereof.

9. The thermoplastic resin composition of claim 1, wherein the thermoplastic resin composition has a melt flow index in accordance with ASTM D1238 using pellets at 315° C. under a weight of 1.2 kg of more than about 5 g/10 min.

10. A molded product prepared by the thermoplastic resin composition of claim 1.

11. A thermoplastic resin composition comprising:
    (A) about 30 to about 50% by weight of a thermoplastic resin;
    (B) about 50 to about 70% by weight of a spherical magnesium oxide; and
    (C) about 5 to about 50 parts by weight of glass fiber based on about 100 parts by weight of the thermoplastic resin composition,
    wherein the spherical magnesium oxide is treated on its surface with a silane compound.

12. The thermoplastic resin composition of claim 11, wherein the spherical magnesium oxide (B) has an average particle size of about 30 to about 80 μm.

13. The thermoplastic resin composition of claim 11, wherein the thermoplastic resin comprises polyamide resin, polyphenylene sulfide resin, polyolefin resin, polyester resin, ABS (acrylonitrile-butadiene-styrene) resin, methacrylic resin, fluoride resin, polysulfone resin, polyether imide resin, polyether sulfone resin, polyether ketone resin, liquid crystal polyester resin, or a combination thereof.

14. The thermoplastic resin composition of claim 13, wherein the thermoplastic resin comprises polyamide resin, polyphenylene sulfide resin, or a combination thereof.

15. The thermoplastic resin composition of claim 11, wherein the silane compound comprises silane oligomer including a vinyl group, amine group, or a combination thereof.

16. The thermoplastic resin composition of claim 11, including the silane compound in an amount of about 0.1 to about 1.0 parts by weight based on about 100 parts by weight of the spherical magnesium oxide (B).

17. The thermoplastic resin composition of claim 15, wherein the silane oligomer including an amine group is a polymer of a monomer comprising N-2(aminoethyl)3-aminopropyl methyldimethoxysilane, N-2(aminoethyl)3-aminopropyl trimethoxysilane, N-2(aminoethyl)3-aminopropyl triethoxysilane, 3-aminopropyl trimethoxysilane, 3-aminopropyl triethoxysilane, 3-triethoxysilyl-N-(1,3-dimethylbutylidene)propyl amine, N-phenyl-3-aminopropyl trimethoxysilane, or a combination thereof.

18. The thermoplastic resin composition of claim 11, wherein the thermoplastic resin composition further comprises antioxidant, lubricant, flame retardant, thermal stabilizer, inorganic additive, pigment, dye, or a combination thereof.

19. The thermoplastic resin composition of claim 11, wherein the thermoplastic resin composition has a thermal conductivity in accordance with ASTM E1461 of more than about 1.30 W/mK.

20. The thermoplastic resin composition of claim 11, wherein the thermoplastic resin composition absorbs moisture in an amount of less than about 1.5% by weight based on the total weight of the thermoplastic resin composition after treating it at 85° C. and relative humidity of 85% for 72 hours.

21. A molded product is prepared by the thermoplastic resin composition of claim 11.

* * * * *